Patented Nov. 1, 1949

2,486,842

UNITED STATES PATENT OFFICE 2,486,842

CATALYTIC OXIDATION OF HYDROCARBONS

George W. Hearne, El Cerrito, and Merrill L. Adams, Modesto, Calif., assignors to Shell Development Company, San Francisco, Calif., a corporation of Delaware No Drawing. Application June 18, 1946, Serial No. 677,530

16 Claims. (Cl. 260—604)

This invention relates to the oxidation of olefins containing at least three carbon atoms to unsaturated carbonylic compounds of the group consisting of the unsaturated aldehydes and the unsaturated ketones containing an olefinic linkage between two carbon atoms of aliphatic character, one of which is linked directly to the carbon atom of the carbonyl group. More particularly, the present invention relates to the catalytic oxidation of the defined class of olefins with the aid of a solid cuprous oxide catalyst, and in particular to such catalytic oxidation in the presence of a minute amount of a compound of chlorine, whereby the yields of the unsaturated carbonylic compounds are desirably increased over those obtained in the absence of the compound of chlorine.

This application is a continuation-in-part of our prior, copending application Serial No. 476,786, filed February 22, 1943, now abandoned. In the indicated prior application there is disclosed a process which comprises contacting an olefin of at least three carbon atoms with cuprous oxide or a solid contact mass comprising cuprous oxide, in the presence of oxygen under conditions at which a substantial amount of the treated olefin is oxidized to an unsaturated carbonylic compound containing the same number of carbon atoms per molecule as the olefin.

In accordance with the present invention, it has been discovered that the oxidation of an olefin containing at least three carbon atoms in the presence of a solid cuprous oxide catalyst to provide an unsaturated carbonylic compound containing the same number of carbon atoms, may be effected with substantially increased yields of the carbonylic compound by conducting the oxidation in the presence of a minute amount of a compound of chlorine, preferably an aliphatic organic compound of chlorine, such as isopropyl chloride. In accordance with the process of the present invention, the provision and regulation of such minute amounts of a compound of chlorine in the reaction mixture results in a substantially greater conversion of consumed olefin to unsaturated carbonylic compound than is obtained under the otherwise existing conditions in the absence of the compound of chlorine.

The process of the present invention is applicable generally to the conversion of olefins of three or more carbon atoms to unsaturated carbonylic compounds of the class consisting of the unsaturated aldehydes and the unsaturated ketones by oxidation in the presence of a solid cuprous oxide catalyst. By the term "olefin" as used herein and in the appended claims is meant the open-chain as well as cyclic olefins. Among the many olefinic compounds which are adapted for use as starting materials, the following may be mentioned: propylene, butene-1, butene-2, isobutylene, diisobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methyl-cyclohexene, etc. These compounds and their various homologs may be substituted in the nucleus and/or in the substituents in various degrees by straight chain alicyclic and/or heterocyclic radicals. The olefins may be treated individually or as mixtures with each other or with the corresponding or other saturated organic compounds. When treated in mixtures, for example, with the corresponding paraffin, the paraffin may remain substantially, if not wholly, unaffected. In other words, by the present process it is possible to selectively oxidize olefins, saturated compounds if present acting merely as diluents. Conversions effectible by the process of the invention include the conversion of propylene to acrolein, isobutylene to methacrolein, alpha- or beta-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

It is to be noted that the vinyl-type carbonylic products obtained by the oxidation of olefins in contact with a solid cuprous oxide catalyst are not necessarily those which would be expected from the direct substitution of an oxygen atom for two hydrogen atoms in the allyl position, that is, for two hydrogen atoms attached to a carbon atom separated from the double bond by an intervening carbon atom, for in that case beta-butylene, for example, would form crotonaldehyde and not methyl vinyl ketone. Instead, the reaction appears to be initiated at the double bond and proceeds with the elimination of a hydrogen atom from the allyl position and a change in position of the double bond.

Straight chain alpha-olefins of three or more carbon atoms when treated according to the present process tend to yield the same products as the corresponding beta-olefins. Thus, as stated above, alpha-butylene as well as beta-butylene yields methyl vinyl ketone and pentene-1 like pentene-2 yields ethyl vinyl ketone. This is thought to result from isomerization of these alpha-olefins to the beta-olefins under the reaction conditions.

The compounds of chlorine which are used advantageously in practicing the process of the present invention are those compounds which possess a substantial volatility at the temperature of reaction in the present process and which decompose at least in part when brought into contact with the cuprous oxide catalyst under the existing conditions of operation. Preferably, chlorine compounds having a boiling point at atmospheric pressure below about 400° C. are employed, although less volatile compounds of chlorine may at times be used. The compounds of chlorine which have been found to be of benefit in accordance with the process of the present invention may be either organic or inorganic, although it frequently is most advantageous to employ an organic compound of chlorine. Chlorinated non-aromatic hydrocarbons, particularly those having boiling points below about 250° C., are of particular value for use in the present process.

As examples of specific compounds of chlorine which advantageously may be used in the process of the present invention, reference may be made to inorganic compounds of chlorine that possess a substantial volatility at the temperature of reaction and which decompose at least in part when brought into contact with the cuprous oxide catalyst under the conditions of operation, such as hydrochloric acid, cupric chloride, ammonium chloride, ferric chloride, and the like, and to organic compounds of chlorine such as acetyl chloride, propionyl chloride, monochlorbenzene, benzyl chloride, benzoyl chloride, and their analogs and homologs, and, preferably, the chlorinated non-aromatic hydrocarbons such as methyl chloride, methylene dichloride, chloroform, carbon tetrachloride, ethyl chloride and chlorine substitution products of ethane containing more than one chlorine atom, propyl chloride, isopropyl chloride, the butyl chlorides, amyl chlorides, vinyl chloride, allyl chloride, crotyl chloride, methallyl chloride and analogous and homologous chlorinated non-aromatic hydrocarbons boiling below about 250° C. at atmospheric pressure and which decompose at least in part when brought into contact with the cuprous oxide catalyst under the existing conditions of operation. Of the indicated organic compounds, it is preferred to use isopropyl chloride or allyl chloride in the process of the present invention.

It has been found that the beneficial effects obtained in accordance with the present invention are quite specific and depend upon the use of a compound of chlorine such as those referred to above. Surprisingly, compounds as closely related even as the corresponding compounds of other halogens, i. e., bromine, iodine, and fluorine, do not provide the advantageous results obtained by the presence of a compound of chlorine during the catalytic oxidation by means of a cuprous oxide catalyst of an olefin containing at least three carbon atoms to an unsaturated carbonylic compound. The reason for this specificity is not well understood. However, it may be noted that the cuprous oxide catalyst itself is quite specific in promoting the oxidation of the olefins to the carbonylic compounds, other metal oxides, or other oxides of copper, leading to the formation of quite different principal products of reaction. It therefore appears probable that a specific inter-relationship exists between the cuprous oxide catalyst and the compounds of chlorine that leads to benefaction of the catalyst under the existing conditions of operation and to consequent improved yields of the unsaturated carbonylic compound relative to the amount of olefins consumed.

The cuprous oxide employed in the execution of the process of the invention preferably is supported on or mixed with a suitable carrier material, such as silica gel, silicon carbide porous aggregates, pumice and the like. Impregnation of the oxide on the carrier may be carried out, for example, by treating the degassed carrier with a concentrated solution of cupric nitrate or chloride or with an ammonium compound comprising copper, as copper ammonium nitrate. The nitrate and ammonium compounds may be decomposed to cuprous oxide by first heating the dried carrier between about 250° C. and 400° C. in a slow stream of air and then reducing the cupric oxide thus formed to cuprous oxide with hydrogen or other suitable reducing agent. Substantially the same procedure is followed in the preparation of the catalyst from the chloride except that repeated oxidation and reduction may be necessary. Cupric oxide is completely ineffective when applied in lieu of cuprous oxide in the execution of the process. It has been found that when the cuprous oxide catalyst is prepared from cupric chloride as above indicated, sufficient chlorine compounds ordinarily remain in the catalyst to provide yields of carbonylic compounds substantially higher than are obtained with a catalyst prepared from, for instance, cupric nitrate. The effect is not permanent, however, and tends to diminish as the catalyst is used. However, considerable benefit may be derived from the indicated effect of the residual chlorine compounds in the event it is desired to use the process of the present invention for the preparation of only limited amounts of unsaturated carbonylic compounds.

According to a preferred mode of executing the process, the olefin to be oxidized is contacted in the vapor state with the supported cuprous oxide in the presence of oxygen or an oxygen-containing gas such as air. The compound of chlorine may be added to either the olefin or to the oxygen or oxygen-containing gas, or, if desired, to the mixed gases. If a diluent gas is present in the reaction mixture, the chlorine compound may be added either separately to the diluent gas prior to admixture with the other components, or to the final reaction mixture.

Various means of adding the desired chlorine compound are available and the present invention is not limited to any specific mode of addition. For example, vapors of the chlorine compound may be metered into the gaseous reaction mixture or one or more of the components thereof, or the chlorine compound in the liquid state may be introduced into and volatilized in the vapors of one or more of the components of the reaction mixture. In the event one or more of the components of the reaction mixture are liquid at normal temperatures, the chlorine compound may be added thereto and volatilized therewith. In the case of continuous operations, a particularly convenient manner of operation is to contact the vapors of at least one of the components of the reaction mixture with the chlorine compound in the liquid state, and to control the amount of chlorine compound thereby added by regulation of the temperature, rate of flow of the vapor, etc.

The amount of chlorine compound thus added in accordance with the present invention represents only a minute amount relative to the total amount of reaction mixture. Generally speaking, there is added an amount less than about 0.40 mole per cent based on the amount of olefin present. Larger amounts may have an inhibitory effect on the cuprous oxide catalyst or may react with either the olefin reactant or the product in the oxidation process with consequent chlorination of the reactant or product. The addition of such larger amounts of chlorine compound therefore generally leads to decreased yields of the desired unsaturated carbonylic compounds, and hence generally is to be avoided. As the amount of added compound of chlorine is decreased from about 0.4 mole per cent, there generally occurs an optimum range wherein the yield of unsaturated carbonylic compound is at a maximum under the otherwise existing conditions. Optimum yields thus generally are obtained in the presence of from about 0.02 to about 0.08 mole per cent of added chlorine compound, based upon the amount of olefin present, although the exact range for optimum results has been found to depend to a certain extent upon the particular compound of chlorine that is employed. Beneficial results may be obtained through the addition of as little as 0.002 mole per cent of added chlorine compound, based upon the amount of olefin. By regulating the amount of chlorine compound present generally within the indicated amounts, the process of the present invention makes it possible to obtain a substantially higher conversion of consumed olefin to the unsaturated carbonylic compound than is obtained under the otherwise existing conditions of operation in the absence of a compound of chlorine.

In effecting the process of the present invention, considerable latitude is permissible in the reaction temperature. However, the reaction temperature, i. e., the temperature of the catalyst, preferably is maintained in the range of from about 200° C. to about 450° C. Catalyst temperatures as high as about 600° C. have at times been found permissible. The temperature used depends primarily upon the catalyst, the particular olefin being treated, and the correlated conditions of the rate of throughput or contact time, and the ratio of olefin to oxygen. Apparent contact times of from about 0.1 sec. to about 10 sec. generally are satisfactory. The apparent contact time may be defined as the length of time in seconds a unit volume of gas measured under the conditions of reaction is in contact with a unit apparent volume of the catalyst. It may be calculated, for example, from the apparent volume of the catalyst bed, the average temperature of the catalyst, the pressure (if different from atmospheric), and the flow rates of the several components of the reaction mixture. Molar ratios of olefin to oxygen between about 1:1 and 8:1 generally give the most satisfactory results. It has been determined that unless the temperature is kept under reasonable control, the oxidation may proceed to the formation of carbon dioxide and water at the expense of the desired product. The temperature may be controlled, for example, by diluting the reaction mixture with steam, by operating with an excess of olefin and/or by using a carrier or supporting material which is a good heat conductor. Also the cuprous oxide, alone or supported on a suitable carrier material, may be used in a dust or "fluidized" form and agitated to dissipate the heat of reaction. The reaction may be conducted at any pressure commensurate with the temperature at which it is desired to operate but usually the reaction is carried out at near atmospheric pressure to avoid the possibility of encountering possible conditions leading to explosion or autoignition of the reaction mixture.

In general, any apparatus of the type suitable for carrying out oxidation reactions in vapor phase may be employed in the execution of the process. When operating with a fixed bed catalyst, as is preferred, the apparatus may comprise a catalyst-packed reaction tube or chamber positioned within a metal block, as an aluminum block, which is provided with appropriate heating and/or cooling elements. The reactor may be brought to the reaction temperature before or after the vapors to be reacted are introduced thereinto. If before, the olefin may be vaporized in the forepart of the tube rather than in a separate vaporizer. In large scale operation, it is preferred to carry out the process in a continuous manner, if desired any unreacted olefin and/or oxygen being recirculated with fresh feed.

The unsaturated carbonyl product or products are isolated from the exit gases from the reaction zone by any appropriate means, the exact procedure in any given case being determined by the nature and relative amounts of the other reaction products. Usually the exit gases are scrubbed with cold water or other appropriate solvent to remove the carbonyl product which is subsequently recovered from the solvent by any suitable means as by distillation. The efficiency of the scrubbing operation may be improved when water is employed as the scrubbing agent by adding a suitable wetting agent, e. g. any soap or soap-like substance, to the water. If desired, scrubbing of the reaction gases may be preceded by an initial cold water quenching thereof, which of itself may serve to separate a large portion of the carbonyl product.

Where molecular oxygen is being employed as the oxidizing agent the residual mixture subsequent to the separation of the carbonyl product may be treated as with a potassium hydroxide solution of suitable strength to effect the removal of any carbon dioxide. The remainder of the mixture which comprises any unreacted olefin and oxygen may then be recycled through the reactor. In the event that air is being used as the oxidizing agent in lieu of molecular oxygen, the residual mixture after separation of the carbonyl product may be scrubbed with a non-polar solvent, e. g. a hydrocarbon fraction such as kerosene, in order to recover unreacted olefin and the remaining gases discarded.

Various phases of the invention are illustrated by the following examples:

EXAMPLE I

The following experiment was carried out in order to determine the effects of the presence of minute amounts of isopropyl chloride upon the oxidation of propylene to acrolein with a solid cuprous oxide catalyst.

A. Oxidation in the absence of a compound of chlorine

One hundred fifty cc. of a cuprous oxide catalyst comprising 0.9 per cent by weight of copper in the form of cuprous oxide, on 8–10 mesh silicon carbide porous aggregates was supported in a vertically positioned stainless steel reaction tube having an internal diameter of 0.98 inch and a length of 44 inches, provided with externally located heating means, and having a 0.25 inch diameter thermocouple well extending coaxially the length of the tube. A mixture of air, propylene and water (steam) was preheated to about 400° C. and passed at a pressure of 10–20 pounds per square inch (gauge) over the catalyst which was maintained at an average temperature of 460° C. and an average maximum temperature of 590° C.–600° C. The components of the mixture were present in the following molar ratios: $H_2O/O_2$, 9–17; $C_3H_6/O_2$, 2.0–2.3; and the mixture was passed into contact with the catalyst for an average contact time of 0.9–1.1 sec.

The gases leaving the reaction tube were analyzed and it was found that 36 per cent of the propylene consumed had been converted to acrolein.

B. *Oxidation in the presence of isopropyl chloride*

The foregoing experiment was repeated using the same catalyst and under the same conditions, but with the addition (to the gaseous mixture entering the reaction tube) of 0.043 mole per cent, based on the propylene, of isopropyl chloride. In this experiment, it was found that 51 per cent of the propylene consumed had been converted to acrolein, or, in other words, the yield of acrolein had been increased by 42 per cent by the presence of the isopropyl chloride.

EXAMPLE II

Propylene was oxidized to acrolein in a manner similar to the experiments given in Example I, but under the following conditions:

Catalyst: 1.2% Cu as cuprous oxide on silicon carbide porous aggregates.
Reactor tube: 5/8 inch x 160 inch steel tube surrounded by molten salt mixture to maintain constant temperature.
Flow rates (moles/min.): Propylene 0.0623; oxygen 0.033; $H_2O$ (steam) 0.354.
Salt bath temperature: 412° C.
Maximum temperature: 421° C.
Pressure: Atmospheric.
Isopropyl chloride added to feed (mole % based on propylene): 0.10.
Yield of products formed, based on propylene consumed:

|  | Per cent |
| --- | --- |
| Acrolein | 63.09 |
| Carbon dioxide | 18.73 |
| Saturated aldehydes | 10.54 |
| Carbon monoxide | 3.05 |
| Acid (as acetic acid) | 1.29 |
| Non-carbonylic compounds | 0.59 |
| Polymeric compounds | 0.10 |
| Unaccounted for | 2.61 |
| Total | 100.00 |

EXAMPLE III

In this experiment, propylene was oxidized to acrolein without added chlorine compound, and then in the presence of minute amounts of HCl added by bubbling the propylene component of the feed through a 19.8% hydrochloric acid solution at room temperature.

Catalyst: 1.06% copper as cuprous oxide on silicon carbide.
Reactor tube: 4.4 cm. x 51 cm. Pyrex glass tube.
Flow rates (moles/min.): Propylene 0.146–0.155; oxygen 0.0073; steam 0.068–0.113.
Temperature: 370° C.
Pressure: Atmospheric.

In the absence of any added chlorine compound, 50.8% of the propylene consumed was converted to acrolein. In the presence of about 0.032 mole % of HCl, based on the propylene, 69.6% of the propylene consumed was converted to acrolein.

EXAMPLE IV

Propylene was oxidized to acrolein in the reactor used in Example III in the presence of a catalyst composed of 2.41% copper as cuprous oxide on silicon carbide, at a maximum catalyst temperature of 363° C. Flow rates of 0.136 mole per minute of propylene, 0.0073 mole per minute of oxygen, and 0.132 mole per minute of $H_2O$ (steam) were employed. 0.11 mole per cent of allyl chloride, based on the propylene, was added to the reactor feed. 57.6 per cent of the propylene consumed was converted to acrolein.

Substantially lower conversions of propylene to acrolein were obtained in the absence of allyl chloride but under otherwise similar conditions.

EXAMPLE V

Isobutylene was oxidized to methacrolein in the presence of a cuprous oxide catalyst. In the absence of any added chlorine compound and at flow rates of 0.068 mole isobutylene per minute, 0.033 mole $O_2$ per minute, and 0.281 mole $H_2O$ (steam) per minute, the maximum temperature recorded in the catalyst bed was 331° C., and 10.0% of the isobutylene fed was found to have been converted to methacrolein (determined as total aldehydes, which were predominantly methacrolein). In the presence of 0.09 mole per cent isopropyl chloride based on the isobutylene and at flow rates of 0.066 mole isobutylene per minute, 0.033 mole $O_2$ per minute, and 0.354 mole water (steam) per minute, the maximum temperature noted in the catalyst bed was 426° C., and 18.1 per cent of the isobutylene fed was found to have been converted to methacrolein (determined as total aldehydes).

EXAMPLE VI

*Experiments in fluidized fixed bed reactor*

The reactor was constructed of mild steel and consisted essentially of a vertically positioned tube, the lower 23 inches of its length having an inside diameter of 2 inches, and the upper 18 inches of its length having an inside diameter of 4 inches. The lower portion was surrounded by electrical heating elements. 310 grams of the catalyst, which contained 8.2 per cent copper in the form of cuprous oxide, on 320 mesh silicon carbide, were placed in the reactor, and the reactor feed passed upwardly through the catalyst bed at a rate sufficient to suspend the catalyst in the gas stream in the narrow portion of the reactor tube.

At a temperature of 400° C., at flow rates of 8 moles propylene per hour, 1.13 moles oxygen (as air) per hour, and 20 moles $H_2O$ (steam) per hour, and at a pressure of 4–6 pounds per square inch, it was found that in the absence of a compound of chlorine there was obtained a 56 per cent yield of acrolein, based on the propylene consumed.

At a temperature of 402° C., at flow rates of 8 moles propylene per hour, 1.04 moles oxygen (as air) per hour, and 20 moles $H_2O$ (steam) per hour, and with the addition to the feed of 0.025 mole per cent isopropyl chloride based on the propylene, there was obtained a yield of acrolein of 70 per cent, based on the propylene consumed.

We claim as our invention:

1. A process of producing methacrolein which comprises reacting a gaseous mixture comprising isobutylene, oxygen, and from about 0.002 mole per cent to about 0.2 mole per cent based on the isobutylene of allyl chloride, in contact with a solid cuprous oxide catalyst maintained within the temperature range of from about 200° C. to about 600° C., under correlated conditions of reaction temperature, time of contact of the mixture with the catalyst, and relative amounts of isobutylene and oxygen in the mixture, to provide methacrolein as the principal product of reaction, thereby obtaining higher relative conversion of consumed isobutylene to methacrolein than is obtained under the existing conditions in the absence of the allyl chloride.

2. A process of producing acrolein which comprises reacting a gaseous mixture comprising propylene, oxygen, and from about 0.002 mole per cent to about 0.2 mole per cent based on the propylene of allyl chloride, in contact with a solid cuprous oxide catalyst maintained within the temperature range of from about 200° C. to about 600° C., under correlated conditions of reaction temperature, time of contact of the mixture with the catalyst, and relative amounts of propylene and oxygen in the mixture, to provide acrolein as the principal product of reaction, thereby obtaining higher relative conversion of consumed propylene to acrolein than is obtained under the existing conditions in the absence of the allyl chloride.

3. A process of producing methacrolein which comprises reacting a gaseous mixture comprising isobutylene, oxygen, and from about 0.002 mole per cent to about 0.2 mole per cent based on the isobutylene of isopropyl chloride, in contact with a solid cuprous oxide catalyst maintained within the temperature range of from about 200° C. to about 600° C., under correlated conditions of reaction temperature, time of contact of the mixture with the catalyst, and relative amounts of isobutylene and oxygen in the mixture, to provide methacrolein as the principal product of reaction, thereby obtaining higher relative conversion of consumed isobutylene to methacrolein than is obtained under the existing conditions in the absence of the isopropyl chloride.

4. A process of producing acrolein which comprises reacting a gaseous mixture comprising propylene, oxygen, and from about 0.002 mole per cent to about 0.2 mole percent based on the propylene of isopropyl chloride, in contact with a solid cuprous oxide catalyst maintained within the temperature range of from about 200° C. to about 600° C., under correlated conditions of reaction temperature, time of contact of the mixture with the catalyst, and relative amounts of propylene and oxygen in the mixture, to provide acrolein as the principal product of reaction, thereby obtaining higher relative conversion of consumed propylene to acrolein than is obtained under the existing conditions in the absence of the isopropyl chloride.

5. A process of producing an unsaturated carbonylic compound of the class consisting of the unsaturated aldehydes and the unsaturated ketones, which comprises passing a gaseous mixture comprising oxygen, an olefin containing at least three carbon atoms, and from about 0.002 mole per cent to about 0.2 mole per cent, based on the olefins, of an aliphatic organic chloride into contact with a solid cuprous oxide catalyst maintained within the temperature range of from about 200° C. to about 600° C., under correlated conditions of reaction temperature, time of contact of the mixture with the catalyst, and relative amounts of olefin and oxygen in the mixture adapted to produce an unsaturated carbonylic compound containing the same number of carbon atoms as the olefin as the principal product of reaction.

6. A process of producing an unsaturated carbonylic compound of the class consisting of the unsaturated aldehydes and the unsaturated ketones, which comprises adding to at least one of the components of a gaseous mixture comprising an olefin containing at least three carbon atoms, and oxygen, a minute amount less than about 0.40 mole per cent based on the olefin of hydrogen chloride, thereafter passing the gaseous mixture containing the hydrogen chloride into contact with a solid cuprous oxide catalyst maintained within the temperature range of from about 200° C. to about 600° C., under correlated conditions of reaction temperature, time of contact of the mixture with the catalyst, and relative amounts of olefin and oxygen in the mixture adapted to provide the unsaturated carbonylic compound as the principal product of reaction, the added hydrogen chloride providing a higher relative conversion of consumed olefin to unsaturated carbonylic compound than is obtained under the existing conditions in the absence of the hydrogen chloride.

7. A process of producing methacrolein which comprises adding to at least one of the components of a gaseous mixture comprising isobutylene and oxygen, a minute amount less than about 0.4 mole per cent based on the isobutylene of an aliphatic organic chloride, thereafter passing the gaseous mixture containing the aliphatic organic chloride into contact with a solid cuprous oxide catalyst maintained within the temperature range of from about 200° C. to about 600° C., under correlated conditions of reaction temperature, time of contact of the mixture with the catalyst, and relative amounts of isobutylene and oxygen in the mixture adapted to provide methacrolein as the principal product of reaction, the added compound of chlorine providing a higher relative conversion of consumed isobutylene to methacrolein than is obtained under the existing conditions in the absence of the compound of chlorine.

8. A process of producing acrolein which comprises adding to at least one of the components of a gaseous mixture comprising propylene and oxygen, a minute amount less than about 0.4 mole per cent based on the propylene, of an aliphatic organic chloride, thereafter passing the gaseous mixture containing the compound of chlorine into contact with a solid cuprous oxide catalyst maintained within the temperature range of from about 200° C. to about 600° C., under correlated conditions of reaction temperature, time of contact of the mixture with the catalyst, and relative amounts of propylene and oxygen in the mixture adapted to provide acrolein as the principal product of reaction, the added compound of chlorine providing a higher relative conversion of consumed propylene to acrolein than is obtained under the existing conditions in the absence of the compound of chlorine.

9. A process of producing an unsaturated carbonylic compound of the class consisting of the unsaturated aldehydes and the unsaturated ketones, which comprises adding to at least one of the components of a gaseous mixture comprising an olefin containing at least three carbon atoms, and oxygen, a minute amount less than about 0.4 mole per cent based on the olefin, of an aliphatic organic chloride, thereafter passing the gaseous mixture containing the organic chloride into contact with a solid cuprous oxide catalyst maintained within the temperature range of from about 200° C. to about 600° C., under correlated conditions of reaction temperature, time of contact of the mixture with the catalyst, and relative amounts of olefin and oxygen in the mixture adapted to provide the unsaturated carbonylic compound as the principal product of reaction, the added organic chloride providing a higher relative conversion of consumed olefin to unsaturated carbonylic compound than is obtained under the existing conditions in the absence of the chloride.

10. A process of producing methacrolein, which comprises adding to at least one of the components of a gaseous mixture comprising isobutylene and oxygen, a minute amount of a chlorine compound having a boiling point under atmospheric pressure less than about 400° C., thereafter passing the gaseous mixture containing the chlorine compound into contact with a solid cuprous oxide catalyst maintained within the temperature range of from about 200° C. to about 600° C., under correlated conditions of reaction temperature, time of contact of the mixture with the catalyst, and relative amounts of isobutylene and oxygen in the mixture adapted to provide methacrolein as the principal product of reaction, and regulating the amount of the chlorine compound added to provide a higher relative conversion of consumed isobutylene to methacrolein than is obtained under the existing conditions in the absence of the chlorine compound.

11. A process of producing acrolein, which comprises adding to at least one of the components of a gaseous mixture comprising propylene and oxygen, a minute amount of a compound of chlorine, thereafter passing the gaseous mixture containing the compound of chlorine into contact with a solid cuprous oxide catalyst maintained within the temperature range of from about 200° C. to about 600° C., under correlated conditions of reaction temperature, time of contact of the mixture with the catalyst, and relative amounts of propylene and oxygen in the mixture adapted to provide acrolein as the principal product of reaction, and regulating the amount of the compound of chlorine added to provide a higher relative conversion of consumed propylene to acrolein than is obtained under the existing conditions in the absence of the compound of chlorine.

12. A process of producing an unsaturated carbonylic compound of the the class consisting of the unsaturated aldehydes and the unsaturated ketones, which comprises adding to at least one of the components of a gaseous mixture comprising an olefin containing at least three carbon atoms, and oxygen, a minute amount of a compound of chlorine, thereafter passing the gaseous mixture containing the compound of chlorine into contact with a cuprous oxide catalyst maintained within the temperature range of from about 200° C. to about 600° C., under correlated conditions of reaction temperature, time of contact of the mixture with the catalyst, and relative amounts of olefin and oxygen in the mixture adapted to provide the unsaturated carbonylic compound of the class consisting of the unsaturated aldehydes and the unsaturated ketones as the principal product of reaction, and regulating the amount of the compound of chlorine added to provide a higher relative conversion of consumed olefin to unsaturated carbonylic compound than is obtained under the existing conditions in the absence of the compound of chlorine.

13. A process of producing an unsaturated carbonylic compound of the class consisting of the unsaturated aldehydes and the unsaturated ketones, which comprises bringing a gaseous mixture comprising an olefin containing at least three carbon atoms, and oxygen into contact with a solid cuprous oxide catalyst in the presence of a minute amount of a chlorinated hydrocarbon having a boiling point below about 250° C., the cuprous oxide catalyst being maintained at a temperature between about 200° C. and about 600° C., thereby producing the unsaturated carbonylic compound of the class consisting of the unsaturated aldehydes and the unsaturated ketones as the principal product of reaction, and regulating the amount of the chlorinated hydrocarbon to provide a higher relative conversion of consumed olefin to unsaturated carbonylic compound than is obtained under the existing conditions in the absence of the chlorinated hydrocarbon.

14. A process of producing methacrolein, which comprises contacting a gaseous mixture comprising isobutylene and oxygen with a solid cuprous oxide catalyst in the presence of a minute amount of a chlorine compound having a boiling point under atmospheric pressure below about 400° C., the cuprous oxide catalyst being maintained at a temperature between about 200° C. and about 600° C., thereby producing methacrolein as the principal product of reaction, and regulating the amount of the chlorine compound to provide a higher relative conversion of the isobutylene consumed to methacrolein than is obtained under the existing conditions in the absence of the chlorine compound.

15. A process of producing acrolein which comprises contacting a gaseous mixture comprising propylene and oxygen with a solid cuprous oxide catalyst in the presence of a minute amount of a chlorine compound having a boiling point under atmospheric pressure below about 400° C., the cuprous oxide catalyst being maintained at a temperature between about 200° C. and about 600° C., thereby producing acrolein as the principal product of reaction, and regulating the amount of the chlorine compound to provide a higher relative conversion of the propylene consumed to acrolein than is obtained under the existing conditions in the absence of the chlorine compound.

16. A process of producing an unsaturated carbonylic compound of the class consisting of the unsaturated aldehydes and the unsaturated ketones, which comprises contacting a gaseous mixture comprising an olefin containing at least three carbon atoms, and oxygen with a solid cuprous oxide catalyst in the presence of a minute amount of a chlorine compound having a boiling point under atmospheric pressure below about 400° C., the cuprous oxide catalyst being maintained at a temperature between about 200° C. and about 600° C., thereby producing the unsaturated carbonylic compound of the class consisting of the unsaturated aldehydes and the unsaturated ketones as the principal product of reaction, and regulating the amount of the chlorine compound to provide a higher relative conversion of consumed olefin to unsaturated carbonylic compound than is obtained under the existing conditions in the absence of the chlorine compound.

GEORGE W. HEARNE.
MERRILL L. ADAMS.

REFERENCES CITED

The following references are of record in the file of this patent:

UNITED STATES PATENTS

| Number | Name | Date |
|---|---|---|
| Re. 20,370 | Lefort | May 18, 1937 |
| 2,265,948 | Loder | Dec. 9, 1941 |
| 2,279,470 | Law et al. | Apr. 14, 1942 |
| 2,430,443 | Becker | Nov. 11, 1947 |